United States Patent [19]

Torbus

[11] Patent Number: 4,558,074
[45] Date of Patent: Dec. 10, 1985

[54] MOULD MATERIAL BINDING AGENT SYSTEM WHICH COLD-HARDENS WITH FORMATION OF POLYURETHANE

[75] Inventor: Marek Torbus, Dusseldorf, Fed. Rep. of Germany

[73] Assignee: Huttenes-Albertus Chemische Werke GmbH, Dusseldorf, Fed. Rep. of Germany

[21] Appl. No.: 699,062

[22] Filed: Feb. 7, 1985

[51] Int. Cl.$^4$ .............................................. C08L 75/04
[52] U.S. Cl. ................................... 523/142; 524/730; 524/796; 528/28; 528/48
[58] Field of Search ................ 523/142; 524/730, 796; 528/28, 48

[56] References Cited

U.S. PATENT DOCUMENTS

| | | | |
|---|---|---|---|
| 3,388,102 | 6/1968 | Brizgys | 524/730 |
| 3,734,936 | 5/1973 | Brown et al. | 524/730 |
| 3,965,057 | 6/1976 | Ammons et al. | 524/730 |

*Primary Examiner*—Maurice J. Welsh
*Attorney, Agent, or Firm*—Jacques M. Dulin, Ltd.

[57] ABSTRACT

This invention relates to a mould material binding agent system for the production of foundry mould parts. This binding agent system contains as components a solution of a phenol-containing polyol having at least two OH groups in the molecule and a polyisocyanate, optionally also in the form of a solution, having at least two NCO groups in the molecule, which react with one another to a cold-hardening binding agent with formation of polyurethane. According to the invention there is also added to the polyisocyanate component a chlorosilane, which for example may comprise one or more compounds of the group trimethyl chlorosilane, dimethyl dichlorosilane, methyl trichlorosilane, tetrachlorosilane, diethyl chlorosilane, vinyl trichlorosilane and diphenyl dichlorosilane. The added quantity is preferably 0.01–2% by wt. relative to the polyisocyanate component.

By the invention a simply and economically producible binding agent is created, which combines high initial strength values of the mould parts with good sand life values of the mould material mixture.

6 Claims, No Drawings

MOULD MATERIAL BINDING AGENT SYSTEM WHICH COLD-HARDENS WITH FORMATION OF POLYURETHANE

In the production of foundry mould parts, the binding agent systems which cold-harden with forming of polyurethane have achieved an increasing importance. These binding agent systems consist of two components, namely a polyol (normally dissolved in a solvent) having at least two OH-groups in the molecule and a polyisocyanate (usually also dissolved in a solvent) having at least two NCO-groups in the molecule. The two components, which are added separately to the mould material mixture, react in the mould material mixture to a hardened polyurethane binding agent, this reaction taking place in the presence of catalysts which assure a rapid reaction and thus satisfactorily short hardening time. As catalysts, apart from other substances such as metallo-organic compounds, tertiary amines in particular may be considered, which are introduced into the mould-making mould as lightly volatile amines with a carrier gas after the forming of the mould material mixture.

The polyol component is usually a condensation product, dissolved in a solvent, of (optionally substituted) phenols with aldehydes (hereinafter termed "phenolic resin" for short), which possesses a small to medium degree of condensation and comprises a fairly large number of free OH-groups in the molecule. In specific cases, especially in the case of mould parts for lower casting temperatures, the polyol component may, however, also be a solution of an oligomeric, dimeric or monomeric phenol body, for example of a terphenol, bisphenol or dihydroxybenzol. For all these polyols there is available a large number of (generally polar) solvents. The solutions are normally adjusted to a solids content of 40–60% by wt. and can contain also usual additives.

As polyisocyanate component, in principle any polyisocyanates having at least two NCO-groups in the molecule may be considered. Preferred are aromatic polyisocyanates, for which diphenyl methane-4,4'-diisocyanate, 2,2',6,6'-tetramethyl diphenyl methane 4,4'-diisocyanate, diphenyl dimethyl methane-4,4'-diisocyanate and diphenyl-4,4'-diisocyanate may be named as typical examples. The polyisocyanates may form the polyisocyanate component in pure form or dissolved in an organic solvent (preferably a mixture of aromatic hydrocarbons having a boiling range above 150° C.). In the case of a solution, the concentration of the polyisocyanate in general is above 70% by wt.

For the production of a mould material mixture, a granular base mould material (quartz sand, chromite sand, olivine sand, zirconium sand or the like) is mixed with the two binding agent components, the ratios of the two components being approximately in the range from 0.5 to 1.5 parts by wt. polyisocyanate component to one part by wt. polyol component and preferably of such values that a virtually stoichiometric ratio of the NCO-groups to the OH-groups results. The mould material mixture is then worked to form foundry mould parts by being placed in a mould-making mould, if necessary compacted and thereafter hardened by brief gasification with a slightly volatile tertiary amine (such as dimethylethylamine, triethylamine or the like). The mould parts can then be removed from the mould-making mould.

Even as early as the gasification stage, the mould parts achieve a measurable strength ("Initial strength"), which slowly increases after the end of gasification to the final strength values. In practice the highest possible initial strengths are desired, so that the mould parts can be removed from the mould-making mould immediately after gasification and the mould-making mould can then be available again for a new moulding operation.

Such sufficiently high initial strength values can definitely be achieved with reactively adjusted binding agent systems. A too high reactivity of the system has, however, the effect that the time during which the mould material mixture, already mixed with the two binding agent components, can be stored before further processing into mould parts (the so-called "sand life") is appreciably reduced. This is a serious disadvantage, because practical operating demands also adequately long sand lives in order that a prepared batch of a mould material mixture shall not prematurely become useless. Good sand lives are obtained with not too reactive binding agent systems, which however in turn lead to worsened initial strength. It has therefore hitherto been necessary to achieve a compromise, usually unsatisfactory, between the requirements for the highest possible initial strength and for the best possible sand life.

It is the objective of the present invention to provide for foundry technology a binding agent system which cold-hardens with formation of polyurethane and which combines the high initial strengths of the mould parts with good sand lives of the mould material mixture and which is simple and economical to manufacture.

This objective is achieved according to the present invention in that a chlorosilane is added to the polyisocyanate component of the binding agent, the chlorosilane being preferably in a proportion of 0.01–2% by wt. relative to the polyisocyanate component (which may be a pure polyisocyanate or a polyisocyanate solution).

The invention is based upon the completely unexpected finding that an addition of small quantities of a chlorosilane to the polyisocyanate component gives a considerable increase in the sand life without this being accompanied by any notable fall in strength. This effect of a chlorosilane addition was not foreseeable and also it cannot be explained at present. It is particularly surprising that this effect is limited to a range of very small added quantities, because it has been found that even quantities as low as 0.01% by wt. (i.e. chlorosilane to the polyisocyanate component in a weight ratio of 1:10,000) result in a notable increase in the sand life and that for added quantities exceeding 2% by wt. the effect of the chlorosilane is again lost.

Basically, all chlorosilanes having at least one chlorine atom in the molecule are suitable for the purpose of this invention. For reasons of practical operating, however, those compounds are preferred which do not have excessive volatility at room temperature. These are the silicon chloride $SiHCl_3$ (trichlorosilane) and $SiCl_4$ (tetrachlorosilane), the partly substituted organochlorosilanes having the general formula $SiR_xH_yCl_{4-(x+y)}$ and the fully substituted organochlorosilanes having the general formula $SiR_nCl_{4-n}$, where in each case R stands for an aliphatic residue having up to six carbon atoms or a (possibly substituted) phenyl residue, x and y are either 1 or 2 and n is a whole number from 1 to 3.

For example, trimethylchlorosilane, dimethyldichlorosilane, methyltrichlorosilane, tetrachlorosilane, diethylchlorosilane, vinyltrichlorosilane and diphenyldichlorosilane have given good results. Also, chlorosilanes having more than one Si atom in the molecule can be used with success, but in general these are not available on the market as commercial products. Insofar as the chlorosilanes are liquid at room temperature, they are added as such to the polyisocyanate component, whereas the chlorosilanes that are solid at room temperature (e.g. the phenyl-substituted types) are advantageously previously dissolved in the same solvent that is used as solvent for the polyisocyanate.

The invention can be used for all binding agent systems on a polyurethane basis, and can therefore be used in conjunction with all conventional polyol components and polyisocyanate components and also does not require any changes in the manufacture and working of the mould material mixtures. The optimum quantity in each case of chlorosilane depends somewhat upon the type and reactivity of the polyol component and can easily be established by simple hand tests for each individual case.

The examples described below and summarised in the table explain the invention. Here the letters "PW" denote parts by weight.

In all cases mould material mixtures were produced which consisted each of
100 PW Quartz sand H 33,
1 PW Polyol component in the form of commercially available solutions of two somewhat different types of a phenolic resin containing OH groups and
1 PW Polyisocyanate component in the form of an 85% solution of diphenyl methyl diisocyanate in a mixture of high-boiling aromatic hydrocarbons.

For the examples of this invention the polyisocyanate component contained in addition also the chlorosilane additive stated in the table, whereas in the reference examples under otherwise equivalent conditions no chlorosilane was added to the polyisocyanate component.

The thus obtained mould material mixtures were processed according to DIN 52 401 by a shooting machine to test objects (cores), which were hardened by brief gasification with dimethyl isopropyl amine and then flushed with air for ten seconds. In the subsequent investigation, the values given in the table were obtained.

In the table the columns headed "Mixture immediately worked" and "Mixture stored for two hours" refer to the time from manufacture of the mixture to the addition of the catalyst, i.e. until gasification. In the first case the mixture was worked immediately after its production and the cores obtained were tested within fifteen seconds (immediately) and within one hour and twenty-four hours respectively after completion of gasifying. The immediate testing supplied the initial strength values and the testing after one and twenty-four hours respectively enabled the rise in strength up to final strength to be found. In the second case, by contrast, the values are based upon mould material mixtures which initially had been stored for two hours without adding of the catalyst before the cores were shot in the corresponding manner and the values for the time-dependence of the bending strength (or sand life) were obtained.

In Example 1 (reference Example) the polyol component (polyol 1) is of such a nature that the mould material mixture leads to good initial strengths when immediately worked and can also be stored for a certain time before working, although after being stored for two hours it can no longer be processed into cores having a useful strength. By the addition of only 0.05 % by wt. dimethyl dichlorosilane (DMDCS) to the polyisocyanate component according to invention Example 2, very good strength values were however obtained after storage for two hours of the mould material mixture, without the strengths on immediate working of the mixture being notably changed.

Example 3, by contrast, is based upon a somewhat more reactive polyol component (polyol 2), so that upon immediate working of the mould material mixture somewhat better initial strengths are obtained. On the other hand, the sand life of this mixture is correspondingly worse, since after two hours the mixture has already hardened and thus is completely useless. The associated Examples 4 and 5 of this invention indicate that even with such a polyol, by an addition of trimethyl chlorosilane (TMCS) very good sand lives can be obtained and that even after storage for two hours of the mixture very good strength values can still be obtained, without the strength values at immediate working of the mixture notably changing. Polyol 2 requires a somewhat higher quantity of added chlorosilane than Example 1, the addition of 0.2% of TMCS (Example 4) being nearly the optimum quantity. With an addition of 0.4% by wt. of TMCS (Example 5), by contrast, the loss of effect which takes place at excessively high added quantities of chlorosilane is already beginning to be noticeable.

TABLE

| Example | Polyol component | Chlorosilane additive to Polyisocyanate component | Mixture immediately worked | | | Mixture stored for 2 hours | | |
|---|---|---|---|---|---|---|---|---|
| | | | Immediate | 1h | 24h | Immediate | 1h | 24h |
| | | | Bending strengths in N/cm$^2$ | | | | | |
| 1 | Polyol 1 | — | 300 | 600 | 650 | 100 | 120 | 140 |
| 2 | Polyol 1 | 0.05% DMDCS | 300 | 580 | 650 | 280 | 500 | 600 |
| 3 | Polyol 2 | — | 340 | 520 | 680 | Sand hardened | | |
| 4 | Polyol 2 | 0.2% TMCS | 340 | 510 | 670 | 300 | 540 | 600 |
| 5 | Polyol 2 | 0.4% TMCS | 340 | 520 | 700 | 280 | 450 | 570 |

It should be understood that various modifications within the scope of this invention can be made by one of ordinary skill in the art without departing from the spirit thereof. I therefore wish my invention to be defined by the scope of the appended claims as broadly as the prior art will permit, and in view of this specification if need be.

I claim:

1. Mould material binding agent system for the manufacture of foundry mould parts, the components of which are a solution of a phenol-containing polyol having at least two OH-groups in the molecule and a polyisocyanate, optionally in the form of a solution, having at least two NCO-groups in the molecule, which react with each other to a cold-hardening binding agent, characterized in that a chlorosilane is added to the polyisocyanate component.

2. Mould material binding agent system according to claim 1, characterized in that the chlorosilane is added to the polyisocyanate component in a proportion of 0.01–2% by wt. relative to the polyisocyanate component.

3. Mould material binding agent system according to claim 1 or 2, characterized in that trichlorosilane and/or tetrachlorosilane is added to the polyisocyanate component.

4. Mould material binding agent system according to one of claims 1 or 2, characterized in that at least one partly substituted organochlorosilane of the general formula $SiR_xH_yCl_{4-(x+y)}$ is added to the polyisocyanate component, where R stands for an aliphatic residue having up to six C-atoms or an (possibly substituted) phenyl residue and $x=1$ and $y=2$ or $x=2$ and $y=1$.

5. Mould material binding agent system according to claim 1, characterized in that at least one fully substituted organochlorosilane of the general formula $SiR_nCl_{4-n}$ is added to the polyisocyanate component, where R stands for an aliphatic residue having up to six C-atoms or an (optionally substituted) phenyl residue and N is a whole number from 1–3.

6. Mould material binding agent system according to one of the preceding claims characterized in that the chlorosilane added to the polyisocyanate component comprises one or more compounds from the group trimethyl chlorosilane, dimethyl dichlorosilane, methyl trichlorosilane, tetrachlorosilane, diethyl chlorosilane, vinyl trichlorosilane and diphenyl dichlorosilane.

* * * * *